US012658438B2

(12) United States Patent
Kim et al.

(10) Patent No.: US 12,658,438 B2
(45) Date of Patent: Jun. 16, 2026

(54) POSITIVE ELECTRODE ACTIVE MATERIAL FOR RECHARGEABLE LITHIUM-ION BATTERIES

(71) Applicant: UMICORE, Brussels (BE)

(72) Inventors: JiHye Kim, Chungcheongnam-do (KR); Jens Martin Paulsen, Chungcheongnam-do (KR); JeongYim Shin, Chungcheongnam-do (KR); Maxime Blangero, Chungcheongnam-do (KR)

(73) Assignee: UMICORE, Brussels (BE)

( * ) Notice: Subject to any disclaimer, the term of this patent is extended or adjusted under 35 U.S.C. 154(b) by 530 days.

(21) Appl. No.: 18/265,496

(22) PCT Filed: Dec. 14, 2021

(86) PCT No.: PCT/EP2021/085732
§ 371 (c)(1),
(2) Date: Jun. 6, 2023

(87) PCT Pub. No.: WO2022/129077
PCT Pub. Date: Jun. 23, 2022

(65) Prior Publication Data
US 2024/0025762 A1     Jan. 25, 2024

(30) Foreign Application Priority Data
Dec. 15, 2020   (EP) ..................................... 20214279

(51) Int. Cl.
*H01M 4/525*        (2010.01)
*C01G 53/50*        (2025.01)
(52) U.S. Cl.
CPC ............ *H01M 4/525* (2013.01); *C01G 53/50* (2013.01); *C01P 2002/85* (2013.01); *C01P 2004/61* (2013.01)

(58) Field of Classification Search
CPC ...... H01M 4/525; H01M 4/405; C01G 53/50; C01G 53/42; C01P 2002/85;
(Continued)

(56) References Cited

U.S. PATENT DOCUMENTS

2013/0130113 A1     5/2013   Takano et al.
2016/0336595 A1     11/2016  Choi et al.
(Continued)

FOREIGN PATENT DOCUMENTS

CN        108091830 A     5/2018
CN        108336331 A     7/2018
(Continued)

OTHER PUBLICATIONS

ISA/EP; International Search Report and Written Opinion for International Patent Application No. PCT/EP2021/085732 dated Mar. 31, 2022, 9 pages.
(Continued)

*Primary Examiner* — Eugenia Wang
(74) *Attorney, Agent, or Firm* — Rimon P.C.; Allyn B. Elliott

(57) ABSTRACT

A positive electrode active material for batteries which comprises Li, M', and oxygen, wherein M' comprises: Ni in a content a between 60.0 mol % and 75.0 mol %; Co in a content x between 0.0 mol % and 20.0 mol %; Mn in a content y between 0.0 mol % and 35.0 mol %, a dopant D in a content z between 0.0 mol % and 2.0 mol %, Al, B and W in a total content c between 0.1 mol % and 5.0 mol %, wherein the active material has an Al content $Al_A$, a B content $B_A$, and a W content $W_A$, wherein a, x, y, z, c, $Al_A$, $B_A$ and $W_A$ are measured by ICP, wherein $Al_A$, $B_A$ and $W_A$, wherein the positive electrode active material, when measured by XPS analysis, shows an average Al fraction $Al_B$, an average B fraction $B_B$ and an average W fraction $W_B$,
(Continued)

wherein $Al_B/Al_A$, $B_B/B_A$, and $W_B/W_A$ are all larger than 1.0, and wherein the positive electrode active material is a single crystalline powder.

13 Claims, 3 Drawing Sheets

(58) Field of Classification Search
CPC ............. C01P 2002/52; C01P 2004/61; C01P 2004/04; C01P 2004/84; Y02E 60/10
See application file for complete search history.

(56) References Cited

U.S. PATENT DOCUMENTS

| | | | |
|---|---|---|---|
| 2019/0123347 | A1 | 4/2019 | Kim et al. |
| 2020/0358094 | A1 | 11/2020 | Oshita et al. |
| 2022/0115657 | A1* | 4/2022 | Lee ........................ C01G 53/00 |

FOREIGN PATENT DOCUMENTS

| | | |
|---|---|---|
| CN | 110265657 A | 9/2019 |
| CN | 111916724 A | 11/2020 |
| EP | 3349276 B1 | 5/2025 |
| JP | 2010118179 A | 5/2010 |
| JP | 2012038724 A | 2/2012 |
| JP | 2013093171 A | 5/2013 |
| JP | 2018092715 A | 6/2018 |
| JP | 2019192513 A | 10/2019 |
| KR | 20150090862 A | 8/2015 |
| KR | 20190079526 A | 7/2019 |
| WO | 2019039567 A1 | 2/2019 |

OTHER PUBLICATIONS

JPO: Notice of Reasons for Rejection for corresponding Japanese Patent Application No. 2023-536164, mailed Jul. 29, 2024, 3 pages.
JPO: Notice of Reasons for Rejection for Japanese Patent Application No. 2023-536165, mailed Jul. 29, 2024, 4 pages.
CNIPA: Notification of First Office Action and Search Report for Chinese Patent Application No. 202180084149.0, mailed Feb. 4, 2025, 9 pages.
KRIPO: Office Action for Korean Patent Application No. 10-2023-7024252, mailed Apr. 9, 2025, 8 pages.
KRIPO: Office Action for Korean Patent Application No. 110-2023-7024013, mailed Apr. 9, 2025, 8 pages.
USPTO: Non-final Office Action issued in U.S. Appl. No. 18/265,527, mailed Dec. 22, 2025, 33 pages.

* cited by examiner

POSITIVE ELECTRODE ACTIVE MATERIAL FOR RECHARGEABLE LITHIUM-ION BATTERIES

CROSS-REFERENCE TO RELATED APPLICATIONS

This application is a U.S. National Stage application of International Patent Application No. PCT/EP2021/085732, filed on Dec. 14, 2021, which claims the benefit of European Patent Application No. 20214279.0, filed on Dec. 15, 2020.

TECHNICAL FIELD

The present invention relates to a positive electrode active material for lithium-ion rechargeable batteries. More specifically, the invention relates to particulate positive electrode active materials comprising Al, B, and W elements; a battery comprising said particulate positive electrode active materials comprising Al and B elements; and, use of said positive electrode active material in a battery in either one of portable computer, a tablet, a mobile phone, an electrically powered vehicle, and an energy storage system.

BACKGROUND

This invention relates to a single-crystalline positive electrode active material powder for lithium-ion rechargeable batteries (LIBs), comprising the elements Al, B, and W.

Positive electrode active materials comprising Al and B elements are already known, for example from US 2016/336595. The document US 2016/336595 discloses positive electrode active material powder comprises a mixture of a lithium nickel manganese cobalt oxide (NMC), $Al(OH)_3$ powder, and $B_2O_3$ powder followed by heating at 400° C. The Ni content in the NMC is around 60 mol %. However, the positive electrode active material according to US 2016/336595 has low initial discharge capacity (DQ1), high irreversible capacity (IRRQ), and high internal resistance (DCR at SOC50%).

It is therefore an object of the present invention to provide positive electrode active material with improved electrochemical properties, such as one or more of the following DQ1, IRRQ, and DCR at SOC50%.

SUMMARY OF THE INVENTION

This objective is achieved by providing a positive electrode active material for lithium-ion rechargeable batteries, wherein the positive electrode active material is a powder, wherein the positive electrode active material comprises Li, M', and oxygen, wherein M' comprises:

Ni in a content a between 60.0 mol % and 75.0 mol %, relative to M';

Co in a content x between 0.0 mol % and 20.0 mol %, relative to M';

Mn in a content y between 0.0 mol % and 35.0 mol %, relative to M',

D in a content z between 0.0 mol % and 2.0 mol %, relative M', wherein D comprises at least one element of the group consisting of: Ba, Ca, Cr, Fe, Mg, Mo, Nb, S, Si, Sr, Ti, Y, V, Zn and Zr, and, Al and B and W, wherein the total content c of Al and B and W is between 0.1 mol % and 5.0 mol %, relative to M', wherein a, x, y, z, and c are measured by ICP, wherein a+x+y+c+z is 100.0 mol %, wherein the positive electrode active material has a Al content $Al_A$, a B content $B_A$, and a W content $W_A$, wherein $Al_A$, $B_A$ and $W_A$ are determined by ICP analysis, wherein $Al_A$, $B_A$ and $W_A$ are expressed as molar fractions compared to the sum of a and x and y, wherein the powder, when measured by XPS analysis, shows an average Al fraction $Al_B$, an average B fraction $B_B$, and an average W fraction $W_B$, wherein $Al_B$, $B_B$ and $W_B$ are expressed as molar fractions compared to the sum of the fractions of Co, Mn and Ni as measured by XPS analysis, wherein the ratio $Al_B/Al_A > 1.0$, wherein the ratio $B_B/B_A > 1.0$, wherein the ratio $W_B/W_A > 1.0$, and, wherein the powder is a single crystalline powder.

It is indeed observed that a higher DQ1, a lower IRRQ, and a lower DCR at SOC50% are achieved using a positive electrode active material according to the present invention, as illustrated by examples and supported by the results provided in Tables 3 and 4.

Further, the present invention provides an electrochemical cell comprising a positive electrode active material according to the first aspect of the invention and a use of a positive electrode active material according to the first aspect of the invention in a battery.

BRIEF DESCRIPTION OF THE FIGURES

By means of further guidance, a figure is included to better appreciate the teaching of the present invention. Said figure is intended to assist the description of the invention and is nowhere intended as a limitation of the presently disclosed invention.

DETAILED DESCRIPTION OF THE INVENTION

Figure 1A:
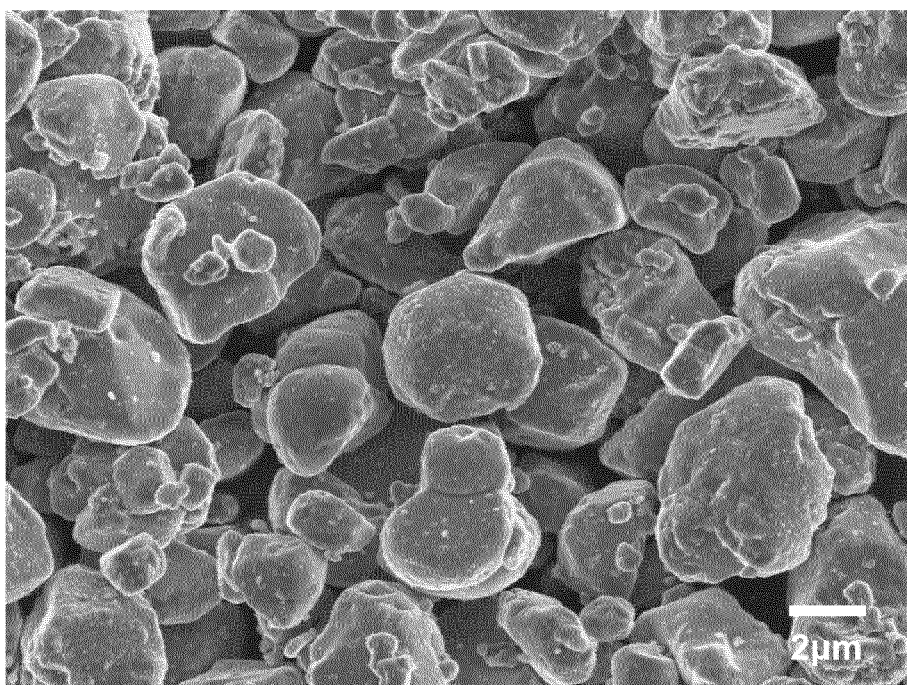
FIG. 1a shows a Scanning Electron Microscope (SEM) image of a positive electrode active material powder according to EX1 with single-crystalline morphology.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention. As used herein, the following terms have the following meanings:

The term 'ppm' is as used in this document means parts per million on a mass basis.

"About" as used herein referring to a measurable value such as a parameter, an amount, a temporal duration, and the like, is meant to encompass variations of +/−20% or less, preferably +/−10% or less, more preferably +/−5% or less, even more preferably +/−1% or less, and still more preferably +/−0.1% or less of and from the specified value, in so far such variations are appropriate to perform in the disclosed invention. However, it is to be understood that the value to which the modifier "about" refers is itself also specifically disclosed.

The recitation of numerical ranges by endpoints includes all numbers and fractions subsumed within that range, as well as the recited endpoints. All percentages are to be understood as percentage by weight, abbreviated as "wt. %" unless otherwise defined or unless a different meaning is obvious to the person skilled in the art from its use and in the context wherein it is used.

The term "median particle size D50", as defined herein, can be interchangeably used with the terms "D50" or "d50" or "median particle size" or "a median particle size (d50 or D50)". D50 is defined herein as the particle size at 50% of the cumulative volume % distributions. D50 is typically determined by laser diffraction particle size analysis.

The term "at %", as defined herein, is equivalent to the term "atomic percent" and signifies atomic percentage. The term "at %" of a given element expression of a concentration means how many percent of all atoms in the concerned compound are atoms of said element. The term "at %" is equivalent to the terms "mol %" or "molar percent".

A positive electrode active material is defined as a material which is electrochemically active in a positive electrode. By active material, it must be understood a material capable to capture and release Li ions when subjected to a voltage change over a predetermined period of time.

Positive Electrode Active Material

In a first aspect, the present invention provides a positive electrode active material for lithium-ion rechargeable batteries, wherein the positive electrode active material is a powder, wherein the positive electrode active material comprises Li, M', and oxygen, wherein M' comprises:

Ni in a content a between 60.0 mol % and 75.0 mol %, relative to M';

Co in a content x between 0.0 mol % and 20.0 mol %, relative to M';

Mn in a content y between 0.0 mol % and 35.0 mol %, relative to M',

D in a content z between 0.0 mol % and 2.0 mol %, relative to M', wherein D comprises at least one element of the group consisting of: Ba, Ca, Cr, Fe, Mg, Mo, Nb, S, Si, Sr, Ti, Y, V, Zn and Zr, and, Al and B and W, wherein the total content c of Al and B and W is between 0.1 mol % and 5.0 mol %, relative to M', wherein a, x, y, z, and c are measured by ICP, wherein a+x+y+c+z is 100.0 mol %, wherein the positive electrode active material has an Al content $Al_A$, a B content $B_A$, and a W content $W_A$, wherein $Al_A$, $B_A$, and $W_A$ are determined by ICP analysis, wherein $Al_A$, $B_A$, and $W_A$ are expressed as molar fractions compared to the sum of a and x and y, wherein the powder, when measured by XPS analysis, shows an average Al fraction $Al_B$, an average B fraction $B_B$, and an average W fraction $W_B$, wherein $Al_B$, $B_B$, and $W_B$ are expressed as molar fractions compared to the sum of the fractions of Co, Mn, and Ni as measured by XPS analysis, wherein the ratio $Al_B/Al_A$>1.0, wherein the ratio $B_B/B_A$>1.0, and wherein the ratio $W_B/W_A$>1.0, and, wherein the powder is a single crystalline powder.

A single-crystalline powder is considered to be a powder in which 80% or more of the particles in a field of view of at least 45 µm×at least 60 µm (i.e. of at least 2700 µm²), preferably of: at least 100 µm×100 µm (i.e. of at least 10,000 µm²) in a SEM image have a single-crystalline morphology.

Figure 1B:
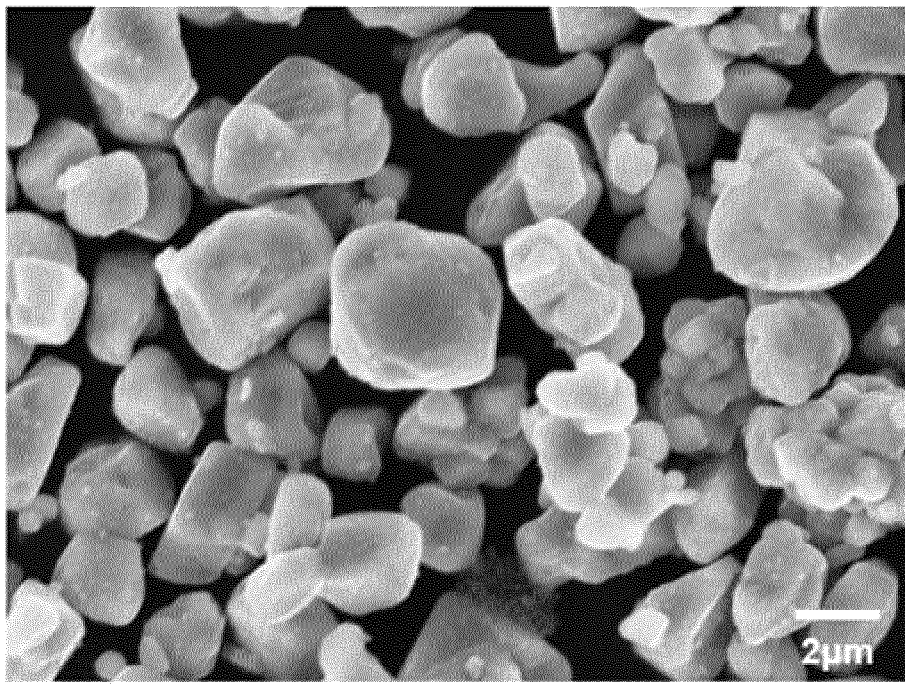
FIG. 1b shows a Scanning Electron Microscope (SEM) image of a positive electrode active material powder according to EX2 with single-crystalline morphology.

A particle is considered to have single-crystalline morphology if it consists of only one grain, or a very low number of a most five, constituent grains, as observed by SEM or TEM. For instance, particles with single-crystalline morphology are shown in FIGS. 1*a* and 1*b* which are the SEM images of EX1 and EX2, respectively.

For the determination of single-crystalline morphology of particles, grains which have a largest linear dimension as observed by SEM which is smaller than 20% of the median particle size D50 of the powder as determined by laser diffraction are ignored. This avoids that particles which are in essence single-crystalline, but which may have deposited on them several very small other grains, are inadvertently considered as not having a single-crystalline morphology.

A positive electrode active material for lithium-ion rechargeable batteries according to the present invention indeed has improved electrochemical properties when used in an electrochemical cell allowing a higher DQ1, a lower IRRQ, and a lower DCR at SOC50% to be achieved. This is illustrated by examples and the results provided in the Table 3.

The XPS analysis provides the atomic content of elements in an uppermost layer of a positive electrode active material particle with a penetration depth of about 10 nm from an outer boundary of the particle. The outer boundary of the particle is also referred to as "surface".

The composition of the positive electrode active material particle can be expressed as the indices a, x, y, z, b, c, and d in a general formula $Li_{1+b}(Ni_aMn_yCo_xA_cD_z)_{1-b}O_2$, according to the stoichiometry of the elements determined by known analysis methods, such as ICP-OES (Inductively coupled plasma-optical emission spectrometry, also referred hereafter as ICP) and IC (ion chromatography). ICP analysis provides the weight fraction of elements in a positive electrode active material particle.

Preferably, the positive electrode active material has a nickel content a, relative to M', of at least 62.0 mol %, and more preferably at least 64.0 mol %, as measured by ICP.

Preferably, the positive electrode active material has a cobalt content x, relative to M', of at least 0.0 mol %, 1.0 mol %, at least 2.0 mol % or even at least 3.0 mol %, as measured by ICP. The present invention provides a positive electrode active material which has a cobalt content x of 0.0, 3.0, 5.0, 7.0, 9.0, or 10.0 mol %, or any value there in between, relative to M', as measured by ICP. In a preferred embodiment, the positive electrode active material has a cobalt content x between 0.0 mol % and 2.0 mol %, relative to M', as measured by ICP.

Preferably, the positive electrode active material has a manganese content y, relative to M', of at most 35.0 mol %, preferably of at most 30.0 mol %, as determined by ICP. Preferably, the positive electrode active material has a manganese content y, relative to M', of at least 10.0 mol %, at least 12.0 mol % or even at least 15.0 mol %, as determined by ICP. The present invention provides a positive electrode active material which has a manganese content y, relative to M', of 15.0, 20.0, 25.0, or 30.0 mol %, or any value there in between, as determined by ICP.

Preferably, the present invention provides a positive electrode active material wherein a molar ratio of lithium to the total molar amount of nickel, manganese, and/or cobalt is 0.95≤Li:Me≤1.10 wherein Me is a total molar fraction of Ni, Mn, and/or Co.

Preferably, the present invention provides a positive electrode active material according to the first aspect of the invention, wherein said particles comprises Al and B and W. The total content of Al, B, and W relative to M', as measured by ICP, is preferably between 0.1 and 5.0 mol %, and more preferably between 0.4 and 2.0 mol %.

Preferably, $Al_A$ is between 0.025 and 2.0 mol %, is expressed as a molar fraction compared to the sum of a and x and y, as measured by ICP.

Preferably, $B_A$ is between 0.025 and 2.0 mol %, is expressed as a molar fraction compared to the sum of a and x and y, as measured by ICP.

Preferably, $W_A$ is between 0.025 and 2.0 mol % is expressed as a molar fraction compared to the sum of a and x and y, as measured by ICP.

Preferably, $B_A$ is at least 0.0015, in other words at least 0.15 mol %, and more preferably $B_A$ is at least 0.0018, in other words at least 0.18 mol %, are expressed as molar fractions compared to the sum of a and x and y, as measured by ICP.

Preferably, $Al_A$ is at most 0.0080, in other words at most 0.8 mol %, are expressed as molar fractions compared to the sum of a and x and y, as measured by ICP.

Preferably, $W_A$ is less than 0.002, in other words less than 0.2 mol %, are expressed as molar fractions compared to the sum of a and x and y, as measured by ICP.

Preferably, the ratio $Al_B/Al_A>10$, and more preferably $Al_B/Al_A>150$.

In a preferred embodiment, the ratio $Al_B/Al_A<800$.

Preferably, the ratio $B_B/B_A>10$, more preferably the ratio $B_B/B_A>30$, and most preferably the ratio $B_B/B_A>115$.

In a preferred embodiment, the ratio $B_B/B_A<500$.

Preferably, the ratio $W_B/W_A>10$, more preferably the ratio $W_B/W_A>50$, and most preferably the ratio $W_B/W_A>115$.

In a preferred embodiment, the ratio $W_B/W_A<500$.

Preferably, the positive electrode active material has a median particle size (d50 or D50) of 2.0 μm to 9.0 μm, as determined by laser diffraction. The median particle size (d50 or D50) can be measured with a Malvern Mastersizer 3000. Preferably, said median particle size is between 2.0 μm and 8.0 μm, more preferably between 3.0 μm and 7.0 μm, and most preferably about 4.0 μm.

It is indeed observed that that the positive electrode active material according to the present invention achieves the objective of providing a higher DQ1, a lower IRRQ, and a lower DCR at SOC50% when used in electrochemical cell, as illustrated by examples and supported by the results provided in Tables 3 and 4.

The DQ1 and IRRQ are determined by a coin cell testing procedure using a 1C current definition of 160 mA/g in the 4.4-3.0 V/Li metal window range and said DCR at SOC50% is determined by a full cell testing procedure using a 1C current definition of 2000 mAh/g at −10° C. The testing procedure is further described in § 1.3 included hereby by reference.

Preferably, the positive electrode active material according to the first aspect of the invention comprises $LiAlO_2$, $Al_2O_3$, and Li—B—O compounds as identified by XPS. Electrochemical Cell In a second aspect, the present invention provides a battery cell comprising a positive electrode active material according to the first aspect of the invention.

In a third aspect, the present invention provides a use of a positive electrode active material according to the first aspect of the invention in a battery of either one of a portable computer, a tablet, a mobile phone, an electrically powered vehicle, and an energy storage system.

EXAMPLES

The following examples are intended to further clarify the present invention and are nowhere intended to limit the scope of the present invention.

1. Description of Analysis Method 1.1. Inductively Coupled Plasma

The composition of a positive electrode active material powder is measured by the inductively coupled plasma (ICP) method using an Agilent 720 ICP-OES (*Agilent Technologies*, https://www.agilent.com/cs/library/brochures/5990-6497EN %20720-725_ICP-OES_LR.pdf). 1 gram of powder sample is dissolved into 50 mL of high purity hydrochloric acid (at least 37 wt. % of HCl with respect to the total weight of solution) in an Erlenmeyer flask. The flask is covered by a watch glass and heated on a hot plate at 380° C. until the powder is completely dissolved. After being cooled to room temperature, the solution from the Erlenmeyer flask is poured into a first 250 mL volumetric flask. Afterwards, the first volumetric flask is filled with deionized water up to the 250 mL mark, followed by a complete homogenization process ($1^{st}$ dilution). An appropriate amount of the solution from the first volumetric flask is taken out by a pipette and transferred into a second 250 mL volumetric flask for the $2^{nd}$ dilution, where the second volumetric flask is filled with an internal standard element and 10% hydrochloric acid up to the 250 mL mark and then homogenized. Finally, this solution is used for ICP measurement.

1.2. Particle Size Distribution

The particle size distribution (PSD) of the positive electrode active material powder is measured by laser diffraction particle size analysis using a Malvern Mastersizer 3000 with a Hydro MV wet dispersion accessory (https://www-.malvernpanalytical.com/en/products/product-range/master-sizer-range/mastersizer-3000 #overview) after having dispersed each of the powder samples in an aqueous medium. In order to improve the dispersion of the powder, sufficient ultrasonic irradiation and stirring is applied, and an appropriate surfactant is introduced. D50 is defined as the particle size at 50% of the cumulative volume % distributions obtained from the Malvern Mastersizer 3000 with Hydro MV measurements.

1.3. Coin Cell Test 1.3.1. Coin Cell Preparation 1.3.1.1. CEX1.1, CEX1.2, EX1, CEX2.1, CEX2.2, and EX2

For the preparation of a positive electrode, a slurry that contains a positive electrode active material powder, conductor (Super P, Timcal), binder (KF #9305, Kureha)—with a formulation of 90:5:5 by weight—in a solvent (NMP, Mitsubishi) is prepared by a high-speed homogenizer. The homogenized slurry is spread on one side of an aluminum foil using a doctor blade coater with a 230 μm gap. The slurry coated foil is dried in an oven at 120° C. and then pressed using a calendaring tool with 40 μm gap.

Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1 M $LiPF_6$ in EC/DMC (1:2) is used as electrolyte and is dropped between separator and electrodes. Then, the coin cell is completely sealed to prevent leakage of the electrolyte.

1.3.1.2. EX3.1, and EX3.2

For the preparation of a positive electrode, a slurry that contains a positive electrode active material powder, conductor (Super P, Timcal), binder (KF #9305, Kureha)—with a formulation of 96.5:1.5:2.0 by weight—in a solvent (NMP, Mitsubishi) is prepared by a high-speed homogenizer. The homogenized slurry is spread on one side of an aluminum foil using a doctor blade coater with a 170 μm gap. The slurry coated foil is dried in an oven at 120° C. and then pressed using a hydraulic calendaring tool with pressure of 530 bar. Then it is dried again in a vacuum oven to completely remove the remaining solvent in the electrode film. A coin cell is assembled in an argon-filled glovebox. A separator (Celgard 2320) is located between a positive electrode and a piece of lithium foil used as a negative electrode. 1 M $LiPF_6$ in EC/DMC (1:2) is used as electrolyte and is dropped between separator and electrodes. Then, the coin cell is completely sealed to prevent leakage of the electrolyte.

1.3.2. Testing Method

The testing method is a conventional "constant cut-off voltage" test. The conventional coin cell test in the present invention follows the schedule shown in Table 1. Each cell is cycled at 25° C. using a Toscat-3100 computer-controlled galvanostatic cycling station (from Toyo, http://www.toyo-system.com/image/menu3/toscat/TOSCAT-3100.pdf).

1C current definition is 160 mAh/g. The initial charge capacity (CQ1) and discharge capacity (DQ1) are measured in constant current mode (CC) at C rate of 0.1C in the 4.3 V to 3.0 V/Li metal window range.

The irreversible capacity IRRQ is expressed in % as follows:

$$IRRQ\ (\%)=100\%*(CQ1-DQ1)/CQ1$$

TABLE 1

| Cycling schedule for Coin cell testing method | | | | | | | |
|---|---|---|---|---|---|---|---|
| C Rate | End current | Rest (min) | V/Li metal (V) | C Rate | End current | Rest (min) | V/Li metal (V) |
| 0.1 | — | 30 | 4.3 | 0.1 | — | 30 | 3.0 |

Full Cell Test 1.3.3. Full Cell Preparation 2000 mAh (flexible) pouch-type cells are prepared as follows: a positive electrode active material powder, a conductor (Super-P, Timcal (*Imerys Graphite & Carbon*)), a graphite (KS6, Timrex (*Imerys Graphite & Carbon*), http://www.imerys-graphite-and-carbon.com/wordpress/wp-app/uploads/2014/04/Powder-Metallurgy.pdf) as conductive agents, and polyvinylidene fluoride (PVDF 1710, *Kureha*, https://www.kureha.co.jp/en/business/material/pdf/KFpolymer_BD_en.pdf) as a binder are added to N-methyl-2-pyrrolidone (NMP) as a dispersion medium so that the weight ratio of the positive electrode active material powder, conductive agents, and binder is set at 96/1/1/2. Thereafter, the mixture is kneaded to prepare a mixture slurry. The resulting mixture slurry is then applied onto both sides of a current collector, made of a 20 μm thick aluminum foil. The width of the applied area is 88.5 mm and the length is 425 mm. The typical loading weight of a positive electrode active material is about 16.9±0.2 mg/cm². The electrode is then dried and calendared using a pressure of 4.5 MPa to an electrode density of 3.25±0.05 g/cm³. In addition, an aluminum plate serving as a cathode current collector tab is arc-welded to an end portion of the positive electrode.

Commercially available negative electrodes are used. In short, a mixture of graphite, carbon, carboxy-methyl-cellulose-sodium (CMC), and styrenebutadiene-rubber (SBR), in a weight ratio of 95/1/1.5/2.5, is applied on both sides of a 8 μm thick copper foil. A nickel plate serving as a negative electrode current collector tab is arc-welded to an end portion of the negative electrode. A typical loading weight of a negative electrode active material is 10±0.5 mg/cm².

Non-aqueous electrolyte is obtained by dissolving a lithium hexafluorophosphate ($LiPF_6$) salt at a concentration of 1.2 mol/L in a mixed solvent of ethylene carbonate (EC), ethyl methyl carbonate (EMC), and diethyl carbonate (DEC) in a volume ratio of 1:1:1, and 1 vol % vinylene carbonate (VC). Additives comprising 1 wt % of $LiPO_2F_2$ are introduced in the above electrolyte.

A sheet of positive electrode, negative electrode, and a separator made of a 13 μm thick microporous polymer film (Asahi) interposed between them are spirally wound using a winding core rod in order to obtain a spirally wound electrode assembly. The assembly and the electrolyte are then put in an aluminum laminated pouch in a dry room with a dew point of −50° C., so that a flat pouch-type lithium rechargeable battery is prepared. The design capacity of the rechargeable battery is 2000 mAh when charged to 4.25 V. The non-aqueous electrolyte solution is impregnated for 8 hours at room temperature. The battery is pre-charged to 15% of its expected full capacity and aged for a day at room temperature. The battery is then degassed, and the aluminum pouch is sealed. The battery is prepared for use as follows: the battery is charged using a current of 0.2C (with 1C=2000 mA) in CC mode (constant current) up to 4.25 V, then in CV mode (constant voltage) until a cut-off current of C/20 is reached, before the discharge in CC mode at 0.2C rate, down to a cut-off voltage of 2.7 V.

1.3.4. Full Cell Test 1.3.4.1. Full Cell Cycle Life Test

The prepared full cell battery is charged and discharged several times under the following conditions at 25° C., to determine their charge-discharge cycle performances:

a. a first charge is performed in CC mode under 1C rate up to 4.25 V, then CV mode until C/20 is reached, b. the cell is then set to rest for 10 minutes, c. a first discharge is done in CC mode at 1C rate down to 2.7 V, d. the cell is then set to rest for 10 minutes, e. the charge-discharge cycles proceed until the battery reaches around 80% retained capacity. Every 100 cycles, one discharge is done at 0.1C rate in CC mode down to 2.7 V.

1.3.4.2. Discharge Direct Current Resistance

The internal resistance or direct current resistance (DCR) is measured by a suitable pulse test of the battery at −10° C. as below:

a. a first charge is performed in CC mode under 1C rate up to 4.25 V, then CV mode until C/20 is reached, b. the cell is then set to rest for 10 minutes, c. a first discharge is done in CC mode at 1C rate down to 90% SOC, d. the cell is then set to rest for 20 minutes, e. a second discharge is performed with 1.5C rate for 10 s followed by 40 s resting, f. a second charge is performed with 1.5C rate for 10 s followed by 1-minute resting, g. steps b to f are repeated with 10% interval until SOC 10% is reached. DCR is measured at each SOC level and DCR at SOC50% is compared.

1.4. X-Ray Photoelectron Spectroscopy (XPS)

In the present invention, X-ray photoelectron spectroscopy (XPS) is used to analyze the surface of positive electrode active material powder particles. In XPS measurement, the signal is acquired from the first few nanometers (e.g. 1 nm to 10 nm) of the uppermost part of a sample, i.e. surface layer. Therefore, all elements measured by XPS are contained in the surface layer.

For the surface analysis of positive electrode active material powder particles, XPS measurement is carried out using a Thermo K-α+ spectrometer (*Thermo Scientific*, https://www.thermofisher.com/order/catalog/product/IQLAAD-GAAFFACVMAHV). Monochromatic Al Kα radiation (hu=1486.6 eV) is used with a spot size of 400 μm and measurement angle of 45°. A wide survey scan to identify elements present at the surface is conducted at 200 eV pass energy. Cis peak having a maximum intensity (or centered) at a binding energy of 284.8 eV is used as a calibrate peak position after data collection. Accurate narrow-scans are performed afterwards at 50 eV for at least 10 scans for each identified element to determine the precise surface composition.

Curve fitting is done with CasaXPS Version2.3.19PR1.0 (*Casa Software*, http://www.casaxps.com/) using a Shirley-type background treatment and Scofield sensitivity factors. The fitting parameters are according to Table 2a. Line shape GL(30) is the Gaussian/Lorentzian product formula with 70% Gaussian line and 30% Lorentzian line. LA(α, β, m) is an asymmetric line-shape where α and β define tail spreading of the peak and m define the width.

TABLE 2a

XPS fitting parameter for Ni2p3, Mn2p3, Co2p3, Al2p, and F1s.

| Element | Sensitivity factor | Fitting range (eV) | Defined peak(s) | Line shape |
|---|---|---|---|---|
| Ni | 14.61 | 851.1 ± 0.1-<br>869.4 ± 0.1 | Ni2p3, Ni2p3 satellite | LA(1.33, 2.44, 69) |
| Mn | 9.17 | 639.9 ± 0.1-<br>649.5 ± 0.1 | Mn2p3, Mn2p3 satellite | GL(30) |

TABLE 2a-continued

XPS fitting parameter for Ni2p3, Mn2p3, Co2p3, Al2p, and F1s.

| Element | Sensitivity factor | Fitting range (eV) | Defined peak(s) | Line shape |
|---|---|---|---|---|
| Co | 12.62 | 775.4 ± 0.1-<br>792.7 ± 0.3 | Co2p3-1, Co2p3-2,<br>Co2p3 satellite | GL(30) |
| Al | 0.54 | 78.5 ± 0.1-<br>64.1 ± 0.1 | Al2p peak 1, Al2p peak 2, Al2p peak 3, Ni3p1, Ni3p3, Ni3p1 satellite, Ni3p3 satellite | GL(30) |
| B | 0.49 | 186.0 ± 0.1-<br>196.3 ± 0.1 | B1s peak 1, B1s peak 2 | GL(30) |
| W | 9.8 | 32.0 ± 0.1-<br>43.0 ± 0.1 | W4f7, W4f5, and W5p3 | GL(30) |

For Al, Co, and W peaks, constraints are set for each defined peak according to Table 2b. Ni3p and W5p3 are not quantified.

TABLE 2b

XPS fitting constraints for Al2p peak fitting.

| Element | Defined peak | Fitting range (eV) | FWHM (eV) | Area |
|---|---|---|---|---|
| Al | Ni3p3 | 65.7-68.0 | 0.5-2.9 | No constraint set |
| | Ni3p1 | 68.0-70.5 | 0.5-2.9 | 50% of Ni3p3 area |
| | Ni3p3 satellite | 70.5-72.5 | 0.5-2.9 | 40% of Ni3p3 area |
| | Ni3p1 satellite | 72.5-75.0 | 0.5-2.9 | 20% of Ni3p3 area |
| | Al2p peak 1 | 72.6-73.2 | 0.5-1.5 | No constraint set |
| | Al2p peak 2 | 73.5-73.9 | 0.5-1.5 | No constraint set |
| | Al2p peak 3 | 73.9-74.7 | 0.5-1.5 | No constraint set |
| B | B1s peak 1 | 192.1-192.3 | 0.1-1.5 | No constraint set |
| | B1s peak 2 | 192.8-193.6 | 0.1-1.5 | No constraint set |
| Co | Co2p3-1 | 776.0-780.9 | 0.5-4.0 | No constraint set |
| | Co2p3-2 | 781.0-785.0 | 0.5-4.0 | No constraint set |
| | Co2p3 satellite | 785.1-792.0 | 0.5-6.0 | No constraint set |
| W | W4f7 | 33.0-36.0 | 0.2-4.0 | No constraint set |
| | W4f5 | 36.1-39.0 | Same as W4f7 | 75% of W4f7 area |
| | W5p3 | 39.1-43.0 | 0.5-2.5 | No constraint set |

Table 2c shows the reference of the maximum peak intensity position range for the Al and B related compounds.

TABLE 2c

XPS peak reference

| Peak | Binding Energy range (eV) | Compound attributed | Literature reference |
|---|---|---|---|
| Al peak1* | 72.6-73.1 | $LiAl_nMe_{1-n}O_2$ | Chem. Mater. Vol. 19, No. 23, 5748- |
| Al peak2 | 73.5-73.9 | $LiAlO_2$ | 5757, 2007; J. Electrochem. Soc., 154 (12) A1088-1099, 2007; and Chem. Mater. Vol. 21, No.23, 5607-5616, 2009. |
| Al peak3 | 73.9-74.7 | $Al_2O_3$ | Wagner, C. D., Handbook of XPS, Perkin-Elmer, 1979; Moulder, J. F., Handbook of XPS, Perkin-Elmer, 1992 |
| B peak 1 | 192.1-192.3 | Li—B—O | Direct measurement on $Li_2B_4O_7$ and $Li_4B_2O_5$ powder |
| B peak 2 | 192.8-193.6 | $H_3BO_3$ | Wagner, C. D., Handbook of XPS, Perkin-Elmer, 1979; Appl. Surf. Sci. Vol. 40, 249-263, 1989 |

*The range of binding energy of Al peak1 varies with the amount of Al doped in the structure.

The Al, B, and W surface contents as determined by XPS are expressed as a molar fractions of Al, B, and W, respectively, in the surface layer of the particles divided by the total content of Ni, Mn and Co in said surface layer. It is calculated as follows:

fraction of $Al=Al_B=Al$ (at %)/(Ni (at %)+Mn (at %)+Co (at %))

fraction of $B=B_B=B$ (at %)/(Ni (at %)+Mn (at %)+Co (at %))

fraction of $W=W_B=W$ (at %)/(Ni (at %)+Mn (at %)+Co (at %)).

2. Examples and Comparative Examples

Comparative Example 1

A single-crystalline positive electrode active material labelled as CEX1.1 is prepared according to the following steps:

Step 1) Transition metal oxidized hydroxide precursor preparation: A nickel-based transition metal oxidized hydroxide powder (TMH1) having a metal composition $Ni_{0.68}Mn_{0.27}Co_{0.05}$ is prepared by a co-precipitation process in a large-scale continuous stirred tank reactor (CSTR) with mixed nickel manganese cobalt sulfates, sodium hydroxide, and ammonia.

Step 2) First mixing: the TMH1 prepared from Step 1) is mixed with LiOH in an industrial blender so as to obtain a first mixture having a lithium to metal (Ni, Co and Mn) ratio of 1.03.

Step 3) First firing: The first mixture from Step 2) is fired at 925° C. for 10 hours in an oxidizing atmosphere so as to obtain a first fired powder followed by air jet milling and sieving.

Step 4) Second mixing: the milled powder obtained from Step 3) is mixed in an industrial blender with 500 ppm Al from alumina powder ($Al_2O_3$), 2.0 mol % Co from $Co_3O_4$ powder, 0.25 mol % Zr from $ZrO_2$ powder, and 2.0 mol % Li from LiOH, each with respect to the total molar contents of Ni, Mn, and Co in the milled powder so as to obtain a second mixture.

Step 5) Second firing: the second mixture from Step 4) is fired at 775° C. for 12 hours in an oxidizing atmosphere so as to obtain a second fired body.

Step 6) Grinding and sieving: the second fired body obtained from Step 5) is grinded and sieved together with alumina powder. The sieved powder comprising 500 ppm Al has a median particle size of 4 µm, as determined by laser diffraction measured with a Malvern Mastersizer 3000.

Step 7) Third mixing: The sieved powder from Step 6) is mixed with $H_3BO_3$ powder in an industrial blender so as to obtain a third mixture comprising 500 ppm of B.

Step 8) Third firing: Third mixture from Step 7) is fired at 375° C. for 7 hours in an oxidizing atmosphere followed by grinding and sieving with 500 ppm of Al from alumina powder with respect to the total weight of mixture from Step 5). The product from this step is a grinded powder labelled as CEX1.1.

Due to the air jet milling in step 3) CEX1.1 is a single-crystalline powder.

CEX1.1 is according to document US 2016/336595.

CEX1.2 is prepared according to the same method as CEX1.1 except that more $H_3BO_3$ powder is added in Step 7) so as to obtain a third mixture comprising 1000 ppm of B.

Example 1

EX1 is prepared according to the same method as CEX1.1 except that $WO_3$ powder is added together with $H_3BO_3$ powder in the Step 7) so as to obtain a third mixture comprising 500 ppm of B and 2000 ppm of W.

Comparative Example 2

A single-crystalline positive electrode active material labelled as CEX2.1 is prepared according to the following steps:

Step 1) Transition metal oxidized hydroxide precursor preparation: A nickel-based transition metal oxidized hydroxide powder (TMH2) having a metal composition $Ni_{0.73}Mn_{0.20}Co_{0.07}$ is prepared by a co-precipitation process in a large-scale continuous stirred tank reactor (CSTR) with mixed nickel manganese cobalt sulfates, sodium hydroxide, and ammonia.

Step 2) First mixing: the TMH2 prepared from Step 1) is mixed with LiOH in an industrial blender so as to obtain a first mixture having a lithium to metal (Ni, Co, and Mn) ratio of 1.00.

Step 3) First firing: The first mixture from Step 2) is fired at 915° C. for 11 hours in an oxidizing atmosphere so as to obtain a first fired powder.

Step 4) Wet bead milling: The first fired powder from Step 3) is bead milled in a solution containing 0.5 mol % Co with respect to the total molar contents of Ni, Mn, and Co in the first fired powder followed by crushing and sieving process so as to obtain a milled powder. The bead milling solid to solution weight ratio is 65%.

Step 5) Second mixing: the milled powder obtained from Step 4) is mixed in an industrial blender with 2.0 mol % Co from $Co_3O_4$ powder, 0.25 mol % Zr from $ZrO_2$ powder, and 8.5 mol % Li from LiOH, each with respect to the total molar contents of Ni, Mn, and Co in the milled powder so as to obtain a second mixture.

Step 6) Second firing: the second mixture from Step 5) is fired at 775° C. for 12 hours in an oxidizing atmosphere so as to obtain a second fired body.

Step 7) Grinding and sieving: the second fired body obtained from Step 6) is grinded and sieved together with alumina powder to obtain a sieved powder. The sieved powder comprising 500 ppm Al has a median particle size of 3.5 µm, as determined by laser diffraction measured with a Malvern Mastersizer 3000.

Step 8) Third mixing: The sieved powder from Step 7) is mixed with $H_3BO_3$ powder in an industrial blender so as to obtain a third mixture comprising 500 ppm of B.

Step 9) Third firing: Third mixture from Step 8) is fired at 375° C. for 7 hours in an oxidizing atmosphere followed by grinding and sieving with 500 ppm of Al from alumina powder with respect to the total weight of mixture from Step 9). The product from this step is a grinded powder labelled as CEX2.1.

Due to the wet milling in step 4) CEX4.1 is a single-crystalline powder.

CEX2.2 is prepared according to the same method as CEX2.1 except that more $H_3BO_3$ powder is added in Step 8 so as to obtain a third mixture comprising 1000 ppm of B.

Example 2

EX2 is prepared according to the same method as CEX2.1 except that $WO_3$ powder is added together with $H_3BO_3$ powder in the Step 8) so as to obtain a third mixture comprising 500 ppm of B and 2000 ppm of W.

Comparative Example 3

A single-crystalline positive electrode active material labelled as CEX3 is prepared according to the following steps:

Step 1) Transition metal oxidized hydroxide precursor preparation: A nickel-based transition metal oxidized hydroxide powder (TMH3) having a metal composition $Ni_{0.70}Mn_{0.30}$ is prepared by a co-precipitation process in a large-scale continuous stirred tank reactor (CSTR) with mixed nickel manganese cobalt sulfates, sodium hydroxide, and ammonia.

Step 2) First mixing: the TMH2 prepared from Step 1) is mixed with LiOH and $ZrO_2$ in an industrial blender so as to obtain a first mixture having a lithium to metal (Ni, Co, and Mn) ratio of 1.05 and 1000 ppm Zr.

Step 3) First firing: The first mixture from Step 2) is fired at 935° C. for 10 hours in an oxidizing atmosphere so as to obtain a first fired powder.

Step 4) Wet bead milling: The first fired powder from Step 3) is bead milled followed by crushing and sieving process so as to obtain a milled powder. The bead milling solid to solution weight ratio is 60%.

Step 5) Second firing: The bead milled powder obtained from Step 4) is heated at 775° C. for 12 hours in air to obtain a second fired powder labelled as CEX3.

Due to the wet milling in step 4) CEX3 is a single-crystalline powder.

Example 3

A single-crystalline positive electrode active material labelled as EX3 is prepared according to the following steps:

Step 1) mixing: CEX3 is mixed in an industrial blender with 250 ppm Al from $Al_2O_3$, 250 ppm B from $H_3BO_3$ powder and 3000 ppm W from $WO_3$ powder, each with respect to the total molar contents of Ni, Mn, and Co in CEX3 so as to obtain a mixture.

Step 2) firing: the mixture from Step 1) is fired at 375° C. for 8 hours in an oxidizing atmosphere so as to obtain a fired body. The product is grinded and labelled as EX3.

TABLE 3

Summary of the composition and the corresponding electrochemical properties of CEX1.1, CEX1.2, EX1, CEX2.1, CEX2.2, and EX2

| | ICP * (expressed as mol %, relative to M') | | | | Coin cell | | Full cell | |
|---|---|---|---|---|---|---|---|---|
| | | | | | DQ1 | IRRQ | DCR at | Cycle |
| ID | Ni | Al | B | W | (mAh/g) | (%) | SOC50% | life |
| CEX1.1 | 67.29 | 0.53 | 0.36 | 0.00 | 168.1 | 14.43 | 240.62 | 3156 |
| CEX1.2 | 66.22 | 0.54 | 0.83 | 0.00 | 171.3 | 13.97 | 272.41 | 6470 |
| EX1 | 66.49 | 0.58 | 0.45 | 0.09 | 173.3 | 13.92 | 224.08 | 6720 |
| CEX2.1 | 71.07 | 0.35 | 0.43 | 0.00 | 186.7 | 11.48 | 221.70 | n.a |
| CEX2.2 | 70.85 | 0.33 | 0.90 | 0.00 | 187.8 | 11.32 | 224.92 | n.a |
| EX2 | 71.03 | 0.31 | 0.44 | 0.10 | 189.4 | 11.41 | 205.78 | n.a |

* as calculated by ICP measurement, M' is a total molar fraction of other elements as analyzed by ICP
n.a: not available

TABLE 4

Summary of the composition and the corresponding electrochemical properties of CEX3 and EX3

| | ICP (expressed as mol %, relative to M') | | | | Coin cell | |
|---|---|---|---|---|---|---|
| | | | | | DQ1 | IRRQ |
| ID | Ni | Al | B | W | (mAh/g) | (%) |
| CEX3 | 70.21 | 0.01 | 0.00 | 0.00 | 162.1 | 15.4 |
| EX3 | 69.96 | 0.10 | 0.22 | 0.16 | 166.7 | 14.2 |

TABLE 5

XPS analysis result of EX2 and the ratio with ICP analysis

| | ICP* | | | XPS** | | | XPS/ICP | | |
|---|---|---|---|---|---|---|---|---|---|
| ID | $Al_A$ | $B_A$ | $W_A$ | $Al_B$ | $B_B$ | $W_B$ | Al | B | W |
| EX2 | 0.0026 | 0.0045 | 0.0010 | 1.18 | 0.57 | 0.24 | 473 | 127 | 239 |

Figure 2A:
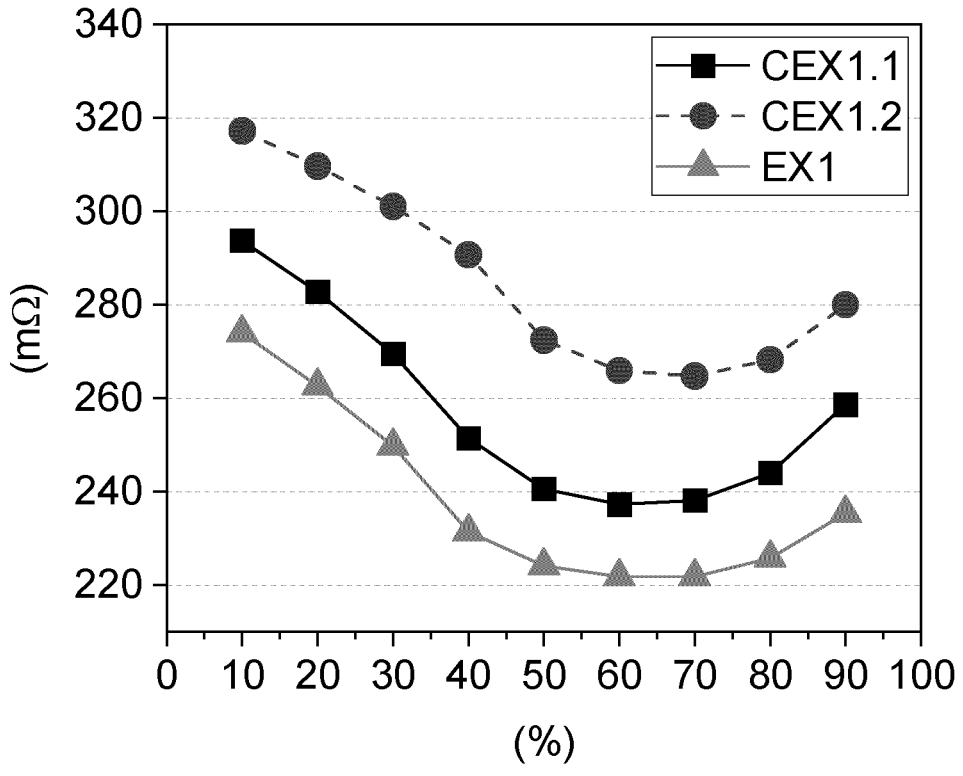
FIG. 2a shows comparison of discharge DCR at −10° C. for CEX1.1, CEX1.2, and EX1 as the function of state of charge in %.
Figure 2B:
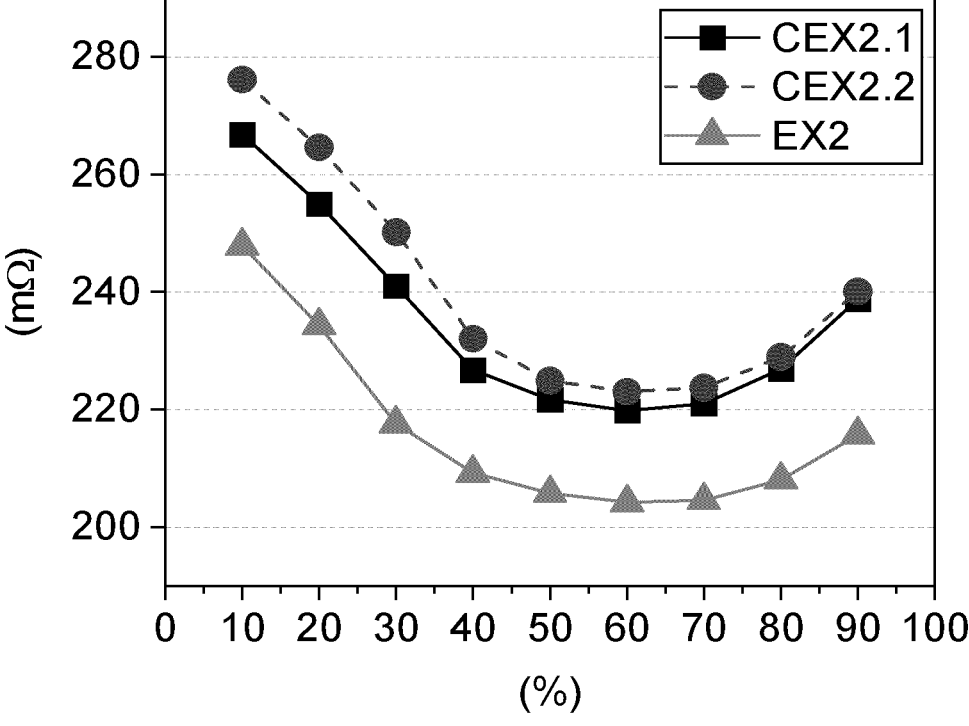
FIG. 2b shows comparison discharge DCR at −10° C. for CEX2.1, CEX2.2, and EX2 as the function of state of charge in %.

*calculated versus the total molar fraction of Ni, Mn, and Co as analyzed by ICP
**calculated versus the total molar fraction of Ni, Mn, and Co as analyzed by XPS Table 3 summarizes the composition of examples and comparative examples and their corresponding electrochemical properties. Comparison between CEX1.1 and CEX1.2 shows addition of extra B in CEX1.2 slightly increases DQ1 and decreases IRRQ but at the same time increases undesirable internal resistance indicated by high DCR at SOC50%. On the other hand, EX1 with the same Ni/M' content as CEX1.1 and CEX1.2 demonstrates higher DQ1 and lower IRRQ in coin cell test and lower DCR at SOC50% as well as better cycle life in full cell test indicating necessity of W presence. Likewise, EX2 with the same Ni/M' content as CEX2.1 and CEX2.2 demonstrate higher DQ1 and lower IRRQ in coin cell test and lower DCR at SOC50% in full cell test. FIGS. 2a and 2b show full discharge DCR measurement from SOC10% to SOC90% wherein EX1 and EX2 both display the lowest discharge DCR at all SOC % among each Ni/M' group of examples and counter examples.

Table 4 shows electrochemical properties comparison between CEX3 and EX3, both having Ni:Mn of 70:30 mol %. EX3 comprising Al, B, and W altogether shows improvement in electrochemical properties indicated by the higher DQ1 and lower IRRQ.

Tables 3 and 4 above show that the presence of Al, B, and W in EX1, EX2, and EX3 is advantageous to improve the electrochemical properties of DQ1 and IRRQ of the positive electrode active materials according to the present invention.

Table 5 summarizes the XPS analysis result of EX2 showing Al, B, and W fraction with respect to the total molar fraction of Ni, Mn, and Co. The table also compares the result with that of ICP. The molar ratio higher than 1 indicating said Al, B, and W are enriched in the surface of the positive electrode active material as associated with the XPS measurement which signal is acquired from the first few nanometers (e.g. 1 nm to 10 nm) of the uppermost part of a sample, i.e. surface layer. On the other hand, Al, B, and W molar ratio from ICP measurement is obtained from the entire particles. Therefore, the ratio of XPS to ICP of higher than 1 indicating said elements Al, B, or W presence mostly on the surface of the positive electrode active material. The ratio of XPS to ICP of higher than 1 is observed for Al, B, and W in EX2.

It is noted that due to the manufacturing method, also EX1 will have ratios of Al, B, and W prevalence as measured by XPS compared to as measured by ICP of significantly higher than 1.

Figure 3A:
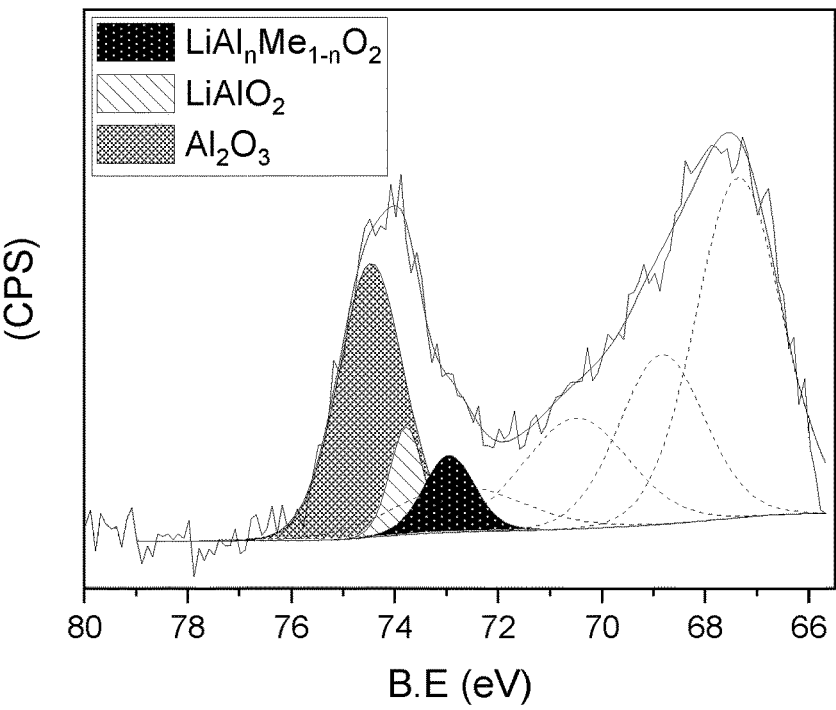
FIG. 3a shows XPS spectra of EX2 measured in the range of 66 to 80 eV comprising Al2p and Ni3p peak.
Figure 3B:
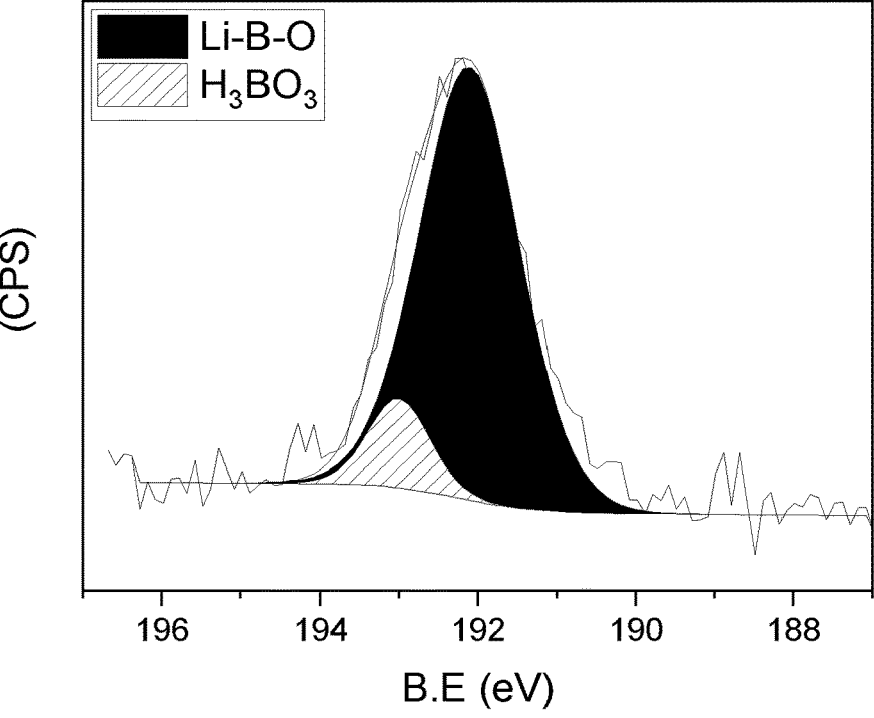
FIG. 3b shows XPS spectra of EX2 measured in the range of 187 to 197 eV comprising Bis peak.

Furthermore, XPS peak location is associated with compounds derived from the preparation process. FIG. 3a shows Al peak of EX2 which overlap with Ni3p peak and FIG. 3b shows Bis peak of EX2. Peak deconvolution is performed to separate contribution of each compounds based on the peak location according to the references listed in Table 2c. Three different Al comprising compounds and Ni3p contributions are separated FIG. 3a, wherein the result shows, EX2 comprises $Al_2O_3$, $LiAlO_2$, and $LiAl_nMe_{1-n}O_2$ on the surface. In FIG. 3b, B1s peak is deconvoluted to a peak belong to $H_3BO_3$ and another peak belong to Li—B—O compounds having a similar peak position. The Li—B—O compounds can be, but not limited to, $Li_2B_4O_7$ and $Li_4B_2O_5$.

The invention claimed is:

1. A positive electrode active material for lithium-ion rechargeable batteries, wherein the positive electrode active material is a powder, wherein the positive electrode active material comprises Li, M', and oxygen, wherein M' comprises:

Ni in a content a between 60.0 mol % and 75.0 mol %, relative to M';

Co in a content x between 0.0 mol % and 20.0 mol %, relative to M';

Mn in a content y between 0.0 mol % and 35.0 mol %, relative to M',

D in a content z between 0.0 mol % and 2.0 mol %, relative M', wherein D comprises at least one element of the group consisting of: Ba, Ca, Cr, Fe, Mg, Mo, Nb, S, Si, Sr, Ti, Y, V, Zn and Zr, and, Al and B and W, wherein the total content c of Al and B and W is between 0.1 mol % and 5.0 mol %, relative to M', wherein a,x,y,z, and c are measured by inductively coupled plasma (ICP), wherein a+x+y+c+z is 100.0 mol %, wherein the positive electrode active material has an Al content $Al_A$, a B content $B_A$, and a W content $W_A$, wherein $Al_A$, $B_A$ and $W_A$ are determined by ICP analysis, wherein $Al_A$, $B_A$ and $W_A$ are expressed as molar fractions compared to a sum of a, x, and y, wherein the powder, when measured by x-ray photoelectron spectroscopy (XPS) analysis, shows an average Al fraction $Al_B$, an average B fraction $B_B$, and an average W fraction $W_B$, wherein $Al_B$, $B_B$ and $W_B$ are expressed as molar fractions compared to a sum of fractions of Co, Mn, and Ni as measured by XPS analysis, wherein the ratio $Al_B/Al_A > 1.0$, wherein the ratio $B_B/B_A > 1.0$, wherein the ratio $W_B/W_A > 1.0$, and, wherein the powder is a single crystalline powder.

2. The positive electrode active material according to claim 1, wherein a is at least 62.0 mol % relative to M', as measured by ICP.

3. The positive electrode active material according to claim 1, wherein the ratio $Al_B/Al_A > 10$.

4. The positive electrode active material according to claim 1, wherein the ratio $Al_B/Al_A < 800$.

5. The positive electrode active material according to claim 1, wherein the ratio $B_B/B_A > 10$.

6. The positive electrode active material according to claim 1, wherein the ratio $B_B/B_A < 500$.

7. The positive electrode active material according to claim 1, wherein the ratio $W_B/W_A > 10$.

8. The positive electrode active material according to claim 1, wherein the ratio $W_B/W_A < 500$.

9. The positive electrode active material according to claim 1, wherein Co in a content x is between 0.0 mol % and 2.0 mol %, relative to M', as measured by ICP.

10. The positive electrode active material according to claim 1, wherein the positive electrode active material has a median particle size $D50_A$ of between 2.0 μm and 7.0 μm, as determined by laser diffraction particle size analysis.

11. The positive electrode active material according to claim 1, wherein M' comprises Al and B and W, each in a content of at least 0.02 mol % relative to M', as measured by ICP.

12. A battery cell comprising the positive electrode active material according to claim 1.

13. A portable computer, a tablet, a mobile phone, an electrically powered vehicle, or an energy storage system comprising the positive electrode active material according to claim 1.

* * * * *